United States Patent
Holoubek et al.

(10) Patent No.: US 8,610,067 B2
(45) Date of Patent: Dec. 17, 2013

(54) RADIATION SOURCE

(75) Inventors: Jiri Holoubek, Ulisbach (CH); Ratnesh Thapliyal, Oerlikon Zurich (CH); Florian Krogmann, Wil (CH); Thomas Burgler, Lichtensteig (CH)

(73) Assignee: Innovative Sensor Technology IST AG, Wattwil (CH)

( * ) Notice: Subject to any disclaimer, the term of this patent is extended or adjusted under 35 U.S.C. 154(b) by 0 days.

(21) Appl. No.: 13/592,549

(22) Filed: Aug. 23, 2012

(65) Prior Publication Data
US 2013/0057850 A1 Mar. 7, 2013

(30) Foreign Application Priority Data
Aug. 25, 2011 (DE) .......................... 10 2011 081 570

(51) Int. Cl.
*G01J 5/00* (2006.01)
(52) U.S. Cl.
USPC ..................................................... 250/338.1
(58) Field of Classification Search
USPC ............................................ 250/338.1–338.5
See application file for complete search history.

(56) References Cited

U.S. PATENT DOCUMENTS

| 3,100,828 A | | 8/1963 | Jacobs |
| 5,637,641 A | * | 6/1997 | Becker et al. ................. 525/102 |
| 6,110,527 A | * | 8/2000 | Brun et al. .................... 427/214 |
| 7,122,815 B2 | | 10/2006 | Wood |

FOREIGN PATENT DOCUMENTS

| DE | 68913533 T2 | 10/1994 |
| EP | 0106431 | 10/1987 |
| JP | 61-240033 | 10/1986 |

OTHER PUBLICATIONS

Vix-Guterl et al., "Synthesis of tubular silicon carbide (SiC) from a carbon-silica material by using a reactive replica technique: mechanism of formation of SiC," 2004, Acta Materialia, vol. 52, pp. 1639-1651.*
German Search Report, May 7, 2012, Munich.

\* cited by examiner

*Primary Examiner* — Kiho Kim
(74) *Attorney, Agent, or Firm* — Bacon & Thomas, PLLC

(57) ABSTRACT

A radiation source for emitting infrared electromagnetic radiation and having at least one source element. The radiation source is characterized by features including that: the source element is embodied in the form of a silicon carbide fiber; the source element is coated at least sectionally with a metal coating, via which the source element can be heated; and the metal coating heats the source element at least at times in such a manner that the source element emits infrared radiation at least at times. A method for the manufacture of a radiation source is likewise relevant.

13 Claims, 3 Drawing Sheets

A-A

A-A

A-A

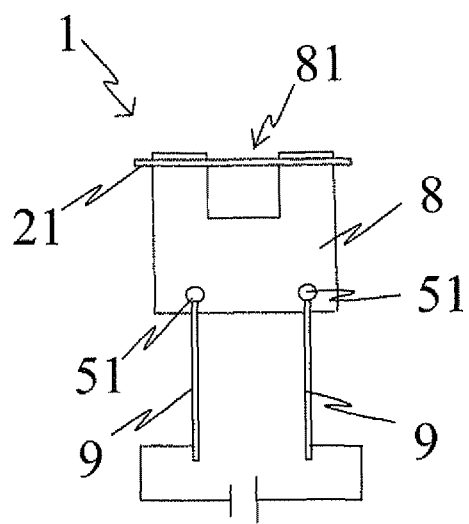
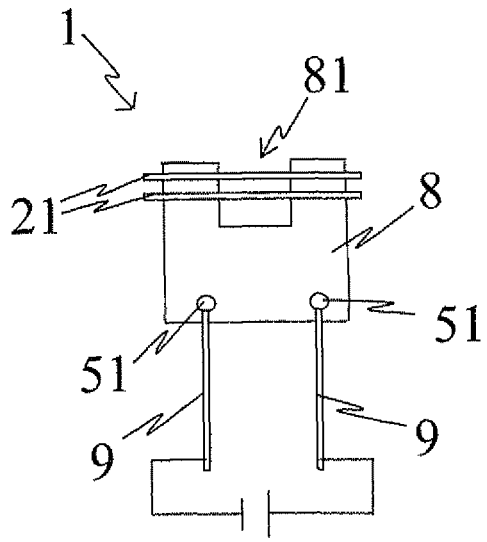
Fig. 3a                                    Fig. 3b
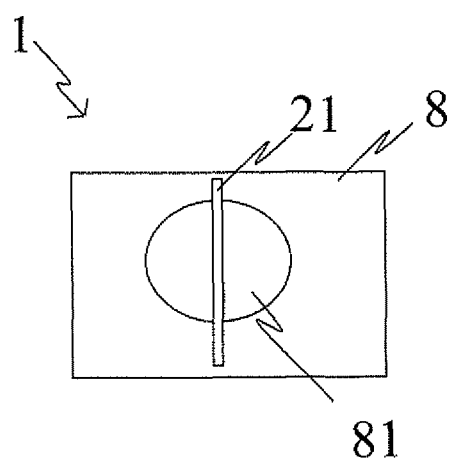
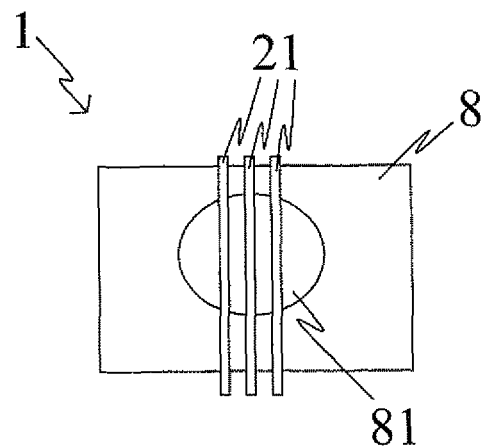
Fig. 3c                                    Fig. 3d

RADIATION SOURCE

TECHNICAL FIELD

The present invention relates to a radiation source for emitting infrared electromagnetic radiation and having at least one source element. Especially, the invention relates to an infrared radiation source for use in a gas sensor, gas analyzer or gas spectrometer.

BACKGROUND DISCUSSION

In gas sensors for measuring a specific gas or gas analyzers for determining various gases, infrared radiation is radiated into a defined gas volume and the absorption spectrum is recorded. Each gas molecule possesses a characteristic absorption behavior, so that from the absorption spectrum the composition of the gas can be determined. Since infrared spectroscopy is a non-invasive method, it presents a versatilely applicable method of chemical analysis. Fields of use include, for example, pharmaceutical analysis, quality control in industrial processes, environmental chemistry, as well as the fields of geology and astronomy.

Serving, as a rule, as an infrared radiation source is a thermal radiator, whose surface is heated to sufficiently high temperatures to provide adequate radiation intensity in the desired wavelength range.

A very widely used thermal radiator was the Nernst glower. Furthermore, the so called Globar, a rod of silicon carbide, which is provided with electrodes on its ends, is known. Via the electrodes, electrical current is led through the rod, whereby such is heated and emits radiation principally in the infrared range.

Described in patent EP 0106431 B1 is an infrared radiation source essentially composed of a ceramic rod with a heating wire wound around it, wherein there is provided in the ceramic rod a black body cavity, which ultimately emits the infrared radiation.

A disadvantage of the radiation sources mentioned is that a modulation of the radiation required for gas spectroscopy cannot be attained via modulation of the heating output, because the thermal mass of the radiator is too great. Instead, mechanical elements, such as, for example, aperture plates, are used. This requires extra space, so that a corresponding gas sensor is relatively large.

An alternative to constantly heated radiation sources are emitters based on thin film technology. The emitters are embodied as a conductive layer on a substrate. Via a pulsating heating current sent through the conductive layer, a pulsation of the emitted radiation can be achieved. Disadvantageous in these radiation sources is the high heat loss, which occurs through the direct contact on the substrate.

An example of a radiation source having a layered structure is shown in the Japanese published patent application JP 03025880 A. Disclosed is an infrared heater for heating a semiconductor wafer, which is constructed of a planar base, an insulating layer applied thereon and a heating layer applied on the insulating layer. Advantageous materials for the infrared radiation emitting insulating layer are ceramics such as aluminum oxide, zirconium oxide, silicon carbide and diamond.

Another group of radiation sources comprise helically wound filaments of a suitable metal or a metal alloy, for example, platinum, tungsten, or nickel chromium. An example for this group is to be found in U.S. Pat. No. 7,122, 815 B2. These can, indeed, be operated using a pulsating heating current, however, they nevertheless possess a high thermal mass, which leads to high power consumption and, moreover, requires cooling. The thermal mass can, indeed, be decreased by making the helically wound filaments correspondingly thin; this, however, brings the disadvantage that the helically wound filament has a low mechanical durability. Furthermore, for example, a tungsten wire can be operated only in an oxygen free atmosphere, which requires its placement in a housing filled with a protective gas. A housing, for example of glass, however, lessens the intensity of the radiation.

SUMMARY OF THE INVENTION

An object of the invention is to provide a modulatable infrared radiation source, which has low power consumption and high thermal stability.

The object is achieved by features including that the source element is embodied in the form of a fiber of silicon carbide, that the source element is coated at least sectionally with a metal coating, via which the source element can be heated, and that the metal coating heats the source element at least at times in such a manner that the source element at least at times emits infrared radiation.

Upon applying a voltage to the metal coating, an electrical current flows through the coating, which heats such to a temperature predetermined by the applied voltage. The metal coating serves as a heating element for the silicon carbide fiber, so that such can be brought to the temperature required for the emission of infrared radiation. The source element is, thus, not flowed through by a heating current, but, instead, is indirectly heated via the coating. Through the modulation of the heating power, the emitted radiation can be likewise modulated. The source element then always emits radiation in the infrared spectral range when, based on the heating via the metal coating, it is at the temperature required for this emission. Due to the small diameter of the fiber, the thermal mass of the source element is likewise small so that a high modulation depth is achieved. The at least one silicon carbide fiber is not only mechanically stable, but also possesses a very good emissivity.

In a first embodiment of the solution of the invention, the silicon carbide fiber has a diameter less than 300 micrometers, preferably less than 150 micrometers, especially between 50 and 150 micrometers.

In an additional embodiment, the metal coating comprises platinum or a platinum alloy. Especially, the metal coating is an alloy containing iridium, rhodium, zirconium, or a rare earth metal. The rare earth metal is preferably yttrium. The metal coating can be applied directly on the source element, or to a adhesion promoting, intermediate layer, which comprises, for example, a platinum chromium alloy or platinum titanium alloy, previously applied on the source element.

In an additional embodiment of the invention, the metal coating has a thickness between 300 and 1800 nanometers.

A further development of the radiation source of the invention is that in which the source element is applied on a substrate. The source element is affixed on the substrate, for example, by means of solder points or high temperature resistant glass anchorages over the two end regions of the source element. Preferably, the points of anchorage are the only contact points between the source element and the substrate. A number of source elements can also be arranged next to one another on the substrate. In this way a surface radiator can be realized.

In an embodiment, the substrate includes at least one through-going cavity and the source element is at least sectionally arranged above the cavity so that the source element emits radiation at least through the cavity.

A further development of the radiation source includes features that each end region of the source element is secured to a holding element and the source element is placed in a housing. In this case, a substrate does not serve as holder, but, instead, two holding elements, for example, rigid wires, which are placed in a housing, serve as a holder. The housing is, for example, a metal, transistor housing, preferably a TO transistor housing.

In a therewith associated embodiment, the holding elements comprise an electrically conductive material and are embodied in such a manner that the metal coating of the source element can be acted upon by an electrical voltage via the holding elements. The holding elements are, for example, embodied as wires, to which the source element can be secured by means of solder. Supplying voltage to the metal coating occurs then via the wires connected to the voltage source.

In an embodiment of the invention, the metal coating is applied on one side of the source element, so that a section of the source element extending along a surface element is free of the coating. Primarily then the uncoated surface serves to radiate infrared radiation. The source element is accordingly applied on the substrate or secured to the holding elements in such a manner that the coating free side faces the desired radiating direction.

In an alternative embodiment, the metal coating is applied on the source element in such a manner that the source element is essentially completely jacketed with the coating. The coating thickness can, in such case, be homogeneous or heterogeneous. For example, the coating on the side facing the radiating direction is thinner than on the opposite side. Preferably, the coating thickness is essentially constant along a surface element.

Additionally, the object of the invention is achieved by a method for the manufacture of a radiation source, wherein at least one silicon carbide fiber is secured at least two securement points on a substrate, wherein the fiber and at least two sections of the substrate, in which the securement points lie, are coated with a metal coating, and wherein the two sections of the substrate, which are coated with the metal coating, are in contact with electrical supply lines, so that an electrical voltage can be applied to the metal coating of the fiber.

In this method, the source element, i.e. the silicon carbide fiber, is coated on one side. If the uncoated source element is secured on the substrate, then its rear side facing away from the substrate can be especially simply coated. Since the substrate is also coated, contacting the source element can directly occur via the substrate to the extent that the coating on the substrate has at least one discontinuity, which electrically isolates the substrate sections in contact with both end regions of the source element from one another.

Furthermore, the invention comprises a gas sensor for analysis of a gas mixture and/or for registering one or more gases. The gas sensor has at least one radiation source of kind as described in one or more of the preceding embodiments. By means of the gas sensor, for example, the composition of a gas can be investigated or a certain gas can be detected. In an embodiment, the gas sensor is embodied to detect or to register quantitatively at least one of the gases, carbon dioxide, ethanol, ammonia and methane. The gas sensor can, however, also be applied for other gases. Gas sensors having radiation sources for the emission of infrared radiation are known from the state of the art, so that their operation will not be explored here in greater detail.

The radiation source of the invention comprising one or more silicon carbide fibers as a source element offers a number of advantages. On the one hand, the source element has a high emissivity over a broad wavelength range in the infrared spectrum. On the other hand, the radiation emission can be modulated electrically via the metal coating embodied as a resistance heater. In this way mechanical modulators are omitted, which leads to a more compact and more cost effective construction of the radiation source. Due to its small thermal mass, the source element has a quick response time so that a quick modulation with a high modulation depth is possible. Moreover, power consumption is small and efficiency is high, which makes the radiation source cost effective and energy efficient. Also, cooling the source element is not required due to the low power consumption. Furthermore, the radiation source also possesses a long service life at high temperatures and a emission spectrum stable over a long time. In contrast to a tungsten wire, an SiC fiber can be used in any oxygen containing environment.

The coated source element can be applied on carriers or holders in a large number of variants and be applied in various housings, so that a suitable design is possible for each application. Since silicon carbide is resistant in normal atmospheric conditions, placement in an evacuated shell or a shell filled with protective gas is not required. For specific applications, in which a specific surrounding gas, for example, for filtering determined wavelengths, is advantageous, an encapsulation is, however, possible.

BRIEF DESCRIPTION OF THE DRAWINGS

The invention will now be explained in greater detail based on the appended drawing, wherein equal parts are designated with equal reference characters. The figures of the drawing show as follows:

FIGS. 3a-3d show different embodiments of a source element applied on a substrate.

DETAILED DISCUSSION IN CONJUNCTION WITH THE DRAWINGS

Figure 1A:
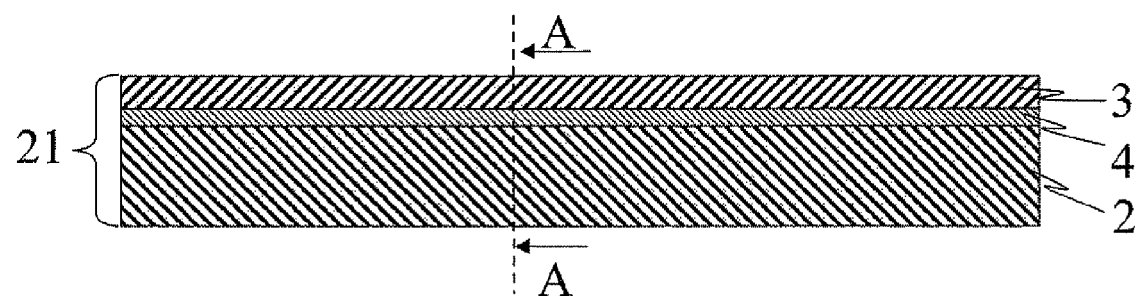
FIGS. 1a-1d shows different embodiments of a coated source element.

FIG. 1a shows the construction of a coated source element 21 schematically in a section along one of the longitudinal axes of the plane containing the source element 2. The infrared radiation emitting source element 2 is a silicon carbide fiber. A fiber is understood, in such case, to be a very thin element, whose length exceeds its diameter by a number of orders of magnitude. The diameter of source element 2 is as small as possible and lies, for example, between 50 and 300 micrometers, preferably between 50 and 150 micrometers.

Source element 2 has two coatings 3, 4, wherein the outer coating is a metal coating 3, which functions as a heating element and, consequently, is characterized by a high electrical resistance. The intermediate layer 4 arranged under metal coating 3 is a adhesion promoting layer, which leads to an improved adhesion of metal coating 3 to the silicon carbide fiber. Intermediate layer 4 can also be omitted. The metal coating 3 preferably comprises platinum or a platinum alloy, for example, platinum iridium, platinum rhodium, or platinum zirconium. Likewise, alloys of platinum and a rare earth metal, especially yttrium, are suitable. The alloys mentioned also possess high stability at high temperatures. The thickness of metal coating 3 is, for example, 800 nm. In general, its thickness is preferably between 300 and 2000 nanometers, especially preferably between 500 and 900 nanometers.

The adhesion promoting, intermediate layer 4, like metal coating 3, likewise comprises platinum. For example, it comprises a platinum chromium or platinum titanium alloy. In principle, however, any material having a adhesion promoting effect can be applied. The coating thickness of intermediate layer 4 is preferably, for instance, 40 to 150 nanometers, especially about 40 nanometers.

Figure 1B:
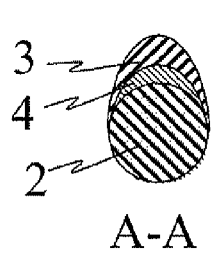
Figure 1C:
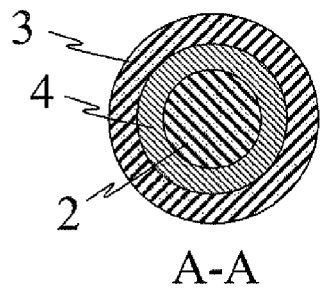

In the form of embodiment illustrated in FIG. 1a, metal coating 3 and intermediate layer 4 are applied on only one side of source element 2. The coatings 3, 4, however, can also completely surround source element 2, wherein the thicknesses of the coatings 3, 4 can, in each case, be homogeneous or heterogeneous. These two cases are presented by way of example in FIGS. 1c and 1d, which show a sectional illustration of the coated source element 2 in a plane A-A perpendicular to the longitudinal axis of source element 2. FIG. 1b shows a form of embodiment corresponding to the sectional illustration shown in FIG. 1a.

FIG. 1b illustrates the case, in which coating 3 is applied on one side, so that a section of source element 2, which extends along a surface element, is free of coating 3.

Figure 1D:
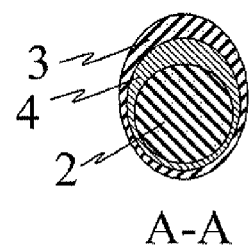

In the form of embodiment illustrated in FIG. 1d, about half of the lateral surface of source element 2 is provided with a very thin metal coating 3, while the other half has a thicker coating 3. The thin part of coating 3 serves then primarily as protection for source element 2 against corrosion or damage to the surface, while the thick part of coating 3 functions principally as the heater for source element 2.

Figure 2:
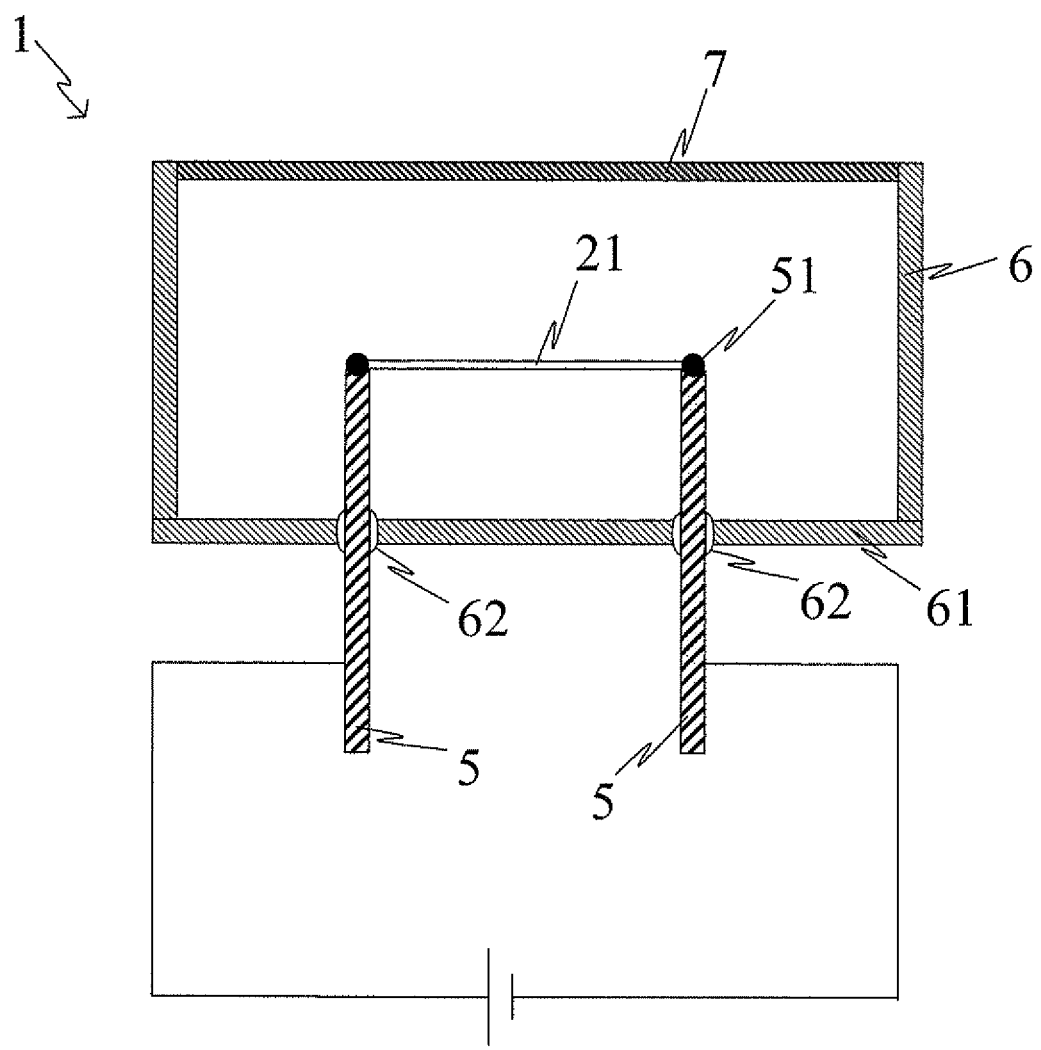
FIG. 2 shows a radiation source with a transistor housing.

FIG. 2 shows an embodiment of a radiation source 1 for a gas sensor, in which the coated source element 21 is placed in a transistor housing. The transistor housing is an established metal TO housing. The application of such a housing for infrared radiation sources having a tungsten wire is known, for example, from U.S. Pat. No. 7,122,815 B2. Two connection pins 5 serve as holding elements for coated source element 21. Connection pins 5 extend through a base plate 61 into a circularly cylindrical metal head part 6. The feed throughs are sealed, in such case, with glass or other insulating material 62 and are electrically insulated from base plate 61.

The transistor housing is sealed by a transmission window 7, through which the radiation emitted by source element 2 escapes. The transistor housing itself is opaque to the radiation. The material of transmission window 7 is matched to the wavelengths of the emitted radiation. For example, sapphire, $CaF_2$, $BaF_2$, ZnSe, and silicon coated with an anti reflection layer are suitable for the transmission of infrared radiation.

Connection pins 5 and the end regions of coated source element 21 are connected to one another by solder points 51. In this way, in addition to the mechanical connection, an electrically conductive connection between connection pins 5 and metal coating 3 of source element 2 is also created. Via a voltage source connected to connection pins 5, a voltage can be applied to metal coating 3. The latter is heated to a specific temperature corresponding to the applied voltage, respectively the heating power, whereby source element 2 is also heated. The temperature of source element 2 is selected in such a manner that it principally emits electromagnetic radiation in a predetermined wavelength range. For use in a gas spectrometer, this is infrared radiation, especially radiation in the near and mid infrared ranges having wavelengths preferably between 1 and 5 micrometers, respectively between 7 and 20 micrometers.

Source element 2 can also emit pulse like radiation when the heating power, respectively the amplitude of the applied voltage is pulsed. The applied voltage can be, in such case, an alternating voltage or even an alternating voltage containing a direct voltage part. The signal form of the voltage can be selected as desired and can be symmetric or asymmetric. For example, a rectangular, triangular or saw tooth voltage, or a sinusoidal voltage can be applied. Also, a variation of the frequency for power control is possible.

By embodying source element 2 as a fiber, source element 2 has a very low thermal mass, so that it reacts rapidly to a change of the heating temperature and the radiated infrared radiation has a high modulation depth, even at relatively high frequencies. In this context, relatively high means more than two hertz, for example, 10-20 Hz. With a smaller modulation depth, modulation with higher frequencies, for example, 50 Hz or more is also possible. Modulation of the emitted radiation enables suppression of disturbance signals when using radiation source 1 in an infrared spectrometer. Through modulation via the applied voltage, means for a mechanical modulation of the radiation, such as, for example, aperture plates, can be omitted, which makes this construction of radiation source 1 compact and cost effective.

FIGS. 3 a-d show, by way of example, schematic plan views of different embodiments of a substrate 8 having one or more source elements 2 applied thereon. Substrate 8 is, for example, an aluminum oxide substrate 8 or a zirconium oxide substrate 8.

In the form of embodiment illustrated in FIG. 3a, a source element 2 is applied on a square substrate 8. Source element is arranged, in such case, in such a manner that it lies sectionally over a cavity 81 in substrate 8. Instead of one cavity 81, a number of cavities of equal or different shapes and sizes can also be provided in substrate 8. These can be embodied as a groove as shown or also only centrally in substrate 8. The radiating of the radiation produced by source element 2 occurs via cavity 81. The installation of radiation source 1 in a sensor occurs, consequently, correspondingly in such a manner that the particular substrate side, on which source element 2 is located, faces away from the object to be irradiated. The connection between source element 2 and substrate 8 is produced, for example, via adhesive locations or by means of glass anchorages, wherein the securements are resistant to high temperatures.

Contacting coated source element 21 occurs directly via substrate 8. For this, substrate 8 is provided with an electrically conductive coating in at least two sections, which, in each case, contact the coated source element 21 with a contact location. The two sections can be embodied as conductive traces or pads; it is important only that they be electrically insulated from one another. Preferably, the coating of substrate 8 is the same metal coating 3, which also coats source element 2. This is especially effective when source element 2 is coated only on one side, since substrate 8 and source element 2 can then be coated in a shared method step. Attached to each of the two metalized sections, for example, at a soldering point or on a contact pad, is an electrical supply line 9. The voltage source for supplying the metal coating 3 of source element 2 with a heating current is connected to the electrical supply lines 9.

FIG. 3b shows a construction essentially equal to the one in FIG. 3a. Instead of a single source element 2, here, two source elements 2 are arranged above cavity 81 in substrate 8 for increasing the radiation intensity. The number of source elements 2 is, however, not limited to one or two. Substrate 8 can serve as a carrier for any number of source elements 2. Through the arrangement of a number of source elements 2 next to one another, preferably parallel to one another, an areal radiation characteristic can be achieved.

FIG. 3c shows an alternative form of embodiment with a rectangular substrate 8, which has an oval cavity 81 in the center of substrate 8. Here also, source element 2 is arranged above cavity 81. The end regions of the source element 2 end on substrate 8, where they are affixed. The affixing is preferably limited to a small area instead of being spread out. For example, the securement can be in the form of a glass drop. The contacting occurs as in FIG. 3a or 3b, via substrate 8. In an alternative embodiment, electrical supply lines 9 are directly connected to the end regions of source element 2. This contacting variant is equally possible for the forms of embodiment in FIG. 3a or 3b.

FIG. 3d shows an embodiment similar to the form of embodiment in FIG. 3c, wherein three coated source elements 21 are arranged parallel to one another over cavity 81 in substrate 8. Since the coated source elements 21 are preferably all connected to the same voltage source, a contacting via a coating of substrate 8 is advantageous. Then, only two electrical contact lines are required.

The invention claimed is:

1. A radiation source for emitting infrared electromagnetic radiation and having at least one source element, said at least one source element is embodied in the form of a silicon carbide fiber, which is coated at least sectionally with a metal coating, via which said at least one source element can be heated, and said metal coating heats said at least one source element at least at times in such a manner that said at least one source element emits infrared radiation at least at times.

2. The radiation source as claimed in claim 1, wherein:
said silicon carbide fiber has a diameter less than 300 micrometers, preferably less than 150 micrometers, especially between 50 and 150 micrometers.

3. The radiation source as claimed in claim 1, wherein:
said metal coating comprises platinum or a platinum alloy, especially an alloy containing iridium, rhodium, zirconium, or a rare earth metal, preferably yttrium.

4. The radiation source as claimed in claim 1, wherein:
said metal coating has a thickness between 300 and 2000 nanometers.

5. The radiation source as claimed in claim 1, wherein:
said at least one source element is applied on a substrate.

6. The radiation source as claimed in claim 1, wherein:
said substrate has at least one through-going cavity; and
said at least one source element is at least sectionally arranged above said cavity so that said at least one source element emits radiation at least through said cavity.

7. The radiation source as claimed in claim 1, wherein:
each end region of said at least one source element is secured to a holding element; and
said at least one source element is placed in a housing.

8. The radiation source as claimed in claim 1, wherein:
said holding elements comprise an electrically conductive material and are embodied in such a manner that said metal coating of said at least one source element can be acted upon by an electrical voltage via said holding elements.

9. The radiation source as claimed in claim 1, wherein:
said metal coating is applied on one side of said at least one source element, so that a section of said at least one source element extending along a surface element is free of the coating.

10. The radiation source as claimed in claim 1, wherein:
said metal coating is applied on said at least one source element in such a manner that said at least one source element is essentially completely jacketed with said coating.

11. A method for the manufacture of a radiation source, comprising:
a radiation source for emitting infrared electromagnetic radiation and having at least one source element, said at least one source element is embodied in the form of a silicon carbide fiber, which is coated at least sectionally with a metal coating, via which said at least one source element can be heated, and said metal coating heats said at least one source element at least at times in such a manner that said at least one source element emits infrared radiation at least at times;
as the method comprising the steps of:
securing at least one silicon carbide fiber at at least two securement points on a substrate; and
coating the fiber and at least two sections of the substrate, in which the securement points lie, with a metal coating, wherein:
the two sections of the substrate, which are coated with the metal coating, are in contact with electrical supply lines, so that an electrical voltage can be applied to the metal coating of the fiber.

12. A gas sensor for analysis of a gas mixture and/or for registering one or more gases, wherein the sensor has at least one radiation source comprising:
a radiation source for emitting infrared electromagnetic radiation and having at least one source element, said at least one source element is embodied in the form of a silicon carbide fiber, which is coated at least sectionally with a metal coating, via which said at least one source element can be heated, and said metal coating heats said at least one source element at least at times in such a manner that said at least one source element emits infrared radiation at least at times.

13. The gas sensor as claimed in claim 12, wherein:
the gas sensor is embodied to measure at least one of the gases, carbon dioxide, ethanol, ammonia and methane.

* * * * *